United States Patent Office 3,594,355
Patented July 20, 1971

3,594,355
WATER-SOLUBLE ISOTHIURONIUM SALTS OF EPIHALOHYDRIN POLYMERS
Edwin J. Vandenberg and William D. Willis, Wilmington, Del., assignors to Hercules Incorporated, Wilmington, Del.
No Drawing. Filed Oct. 29, 1969, Ser. No. 872,344
Int. Cl. C08g 23/00
U.S. Cl. 260—79R          9 Claims

ABSTRACT OF THE DISCLOSURE

Water-soluble isothiuronium salts of epihalohydrin homopolymers or copolymers with one another or with ethylene oxide are described which are highly useful as shrinkproofing agents for wool, as flocculating agents and as paper additives for increasing both wet and dry strength. These isothiuronium salts can be prepared in solution whereupon only about 5% of the halo groups need be converted to isothiuronium groups to obtain water-solubility of the product or they can be prepared in the substantial absence of a solvent whereupon about 50% of the halo groups need to be converted to obtain water-solubility of the product.

---

This invention relates to water-soluble polymeric isothiuronium salts and more particularly to epihalohydrin polymers in which at least about 5% of the halo groups have been replaced with isothiuronium salt groups and which are water-soluble.

It is well known that the halogen of the halomethyl groups in epihalohydrin polymers can be substituted with various groups by reacting the polymer with, for example, the alkali metal salt of the substituting group. It is also well known that epihalohydrin polymers are readily crosslinked by reaction with a polyamine alone or with a cyclic nitrogen compound such as ethylene thiourea in the presence of a metal oxide.

Now in accordance with this invention, it has been found that an epihalohydrin homopolymer or ethylene oxide copolymer can be converted to water-soluble isothiuronium salts which are highly useful as shrinkproofing agents for wool, as wet and dry strength paper additives, as flocculating agents, as cross-linkable coatings for textiles, and as semipermeable membranes for desalting water or for making other reverse osmosis type separations. These new polymeric materials are produced by reacting the epihalohydrin polymer with a thiourea. The percent of halogroups in the polymer that must be replaced by isothiuronium salt groups to yield a useful water-soluble product will depend on the epihalohydrin polymer used and on the process by which the isothiuronium salt is prepared. In any event, to be useful, at least about 5% of the halo groups should be replaced by isothiuronium salt groups and the polymer product should contain an average of at least about 5 isothiuronium salt groups.

Any epihalohydrin homopolymer, copolymer of two or more epihalohydrins, or copolymer of one or more epihalohydrins with ethylene oxide and containing at least 2% by weight of epihalohydrin, having a weight average molecular weight of at least about 50,000, can be converted to the water soluble isothiuronium salts of this invention. These epihalohydrin polymers can be wholly amorphous, partially crystalline, or wholly crystalline. The preparation of such polymers is described in U.S. patents such as 2,871,219, 3,135,705, 3,158,580, 3,158,581 and 3,415,761. To produce the water-soluble isothiuronium salts of this invention, the epihalohydrin-ethylene oxide copolymers which have a high ethylene oxide content and hence are water-soluble should contain at least about 2 weight percent of epihalohydrin, preferably at least about 5% and more preferably at least about 10%, whereas those copolymers which have a lower ethylene oxide content and hence are water-insoluble, will preferably contain at least about 30% epihalohydrin, and more preferably at least 50% epihalohydrin. In any case, at least about 5% of the halomethyl groups in the polymer must be converted to isothiuronium salt groups and the product must contain an average of at least about five isothiuronium salt groups per molecule and preferably an average of at least about ten isothiuronium salt groups per molecule.

Any thiourea can be reacted with the epihalohydrin polymer to convert the halo groups to isothiuronium salt groups. Exemplary of the thioureas that can be so reacted are unsubstituted thiourea and mono-, di-, tri-, or tetra-substituted thioureas having the general formula

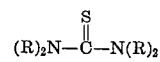

where the R's can be alike or different and are H, alkyl, alkenyl, cycloalkyl, cycloalkenyl, aryl, alkaryl, aralkyl or where two R's taken together are alkylene, as for example, thiourea, methyl thiourea, 1,1-dimethyl thiourea, 1,3-dimethyl thiourea, trimethyl thiourea, tetramethyl thiourea, 1-butyl thiourea, 1,3-dibutyl thiourea, 1-octyl thiourea, 1-stearyl thiourea, 1-phenyl thiourea, 1,3-diphenyl thiourea, 1-cyclohexyl thiourea, ethylene thiourea, 4-methyl ethylene thiourea, 4,4-dimethyl ethylene thiourea, 1,3-dimethyl ethylene thiourea, 1,3-diethyl ethylene thiourea, 1-dihydrodicyclopentadienyl-3,3-dimethyl thiourea, 1-norbonyl-3,3-dimethyl thiourea, 1-allyl-3,3-dimethyl thiourea, etc. Mixtures of the thioureas can also be used in the reaction.

The amount of the thiourea that is reacted with the epihalohydrin polymer can be varied over a wide range. Preferably there is used at least about a 10% excess of thiourea over the stoichiometric amount, based on the halo content of the polymer, and any amount up to a ten-fold or more excess over the stoichiometric amount can be used.

The reaction between the epihalohydrin polymer and the thiourea can be carried out in solution, in suspension, or in the substantial absence of a liquid reaction diluent. It has been found that an entirely different polymer is obtained when the reaction is carried out in the bulk or in suspension, i.e., in the substantial absence of a solvent medium, from that obtained when the reaction is carried out in solution and that the percent of halo groups converted to isothiuronium salt groups to obtain water-solubility from a water-insoluble starting polymer is different. It has been discovered that when an epihalohydrin polymer is reacted with a thiourea in bulk or suspension, to produce a water-soluble product from a water-insoluble polymer, at least about 50% of the halo groups must be converted to isothiuronium salt groups. On the other hand, if the reaction is carried out in solution, only about 5%, preferably about 10% of the halo groups need to be converted to isothiuronium salt groups to obtain water-solubility. Obviously if the polymer is water-soluble to start with, it will remain water-soluble regardless of the number of halo groups converted to isothiuronium salt groups. It is believed that the isothiuronium product obtained from the bulk or suspension reaction is a block copolymer containing blocks of epihalohydrin units (or units of the epihalohydrin-ethylene oxide copolymer) and blocks where all of the halo groups have been replaced by isothiuronium salt groups. Thus the product from an epichlorohydrin homopolymer would contain blocks of the following units

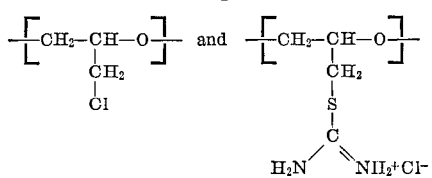

A copolymer would of course also contain ethylene oxide units which could be in blocks or randomly distributed, depending on the structure of the starting copolymer. When the reaction is carried out in solution, a water-soluble isothiuronium salt is produced, but, as stated above, only a low degree of substitution is required to obtain water-solubility.

The choice of the method by which the epihalohydrin polymer is converted to the isothiuronium salt will depend in large measure on their intended use. Thus for applications where only a relatively low percentage of isothiuronium salt groups is required, the solution method will be utilized. In applications where a higher percentage of isothiuronium salt groups is generally desired, the reaction will preferably be carried out by the bulk or suspension process. This is because it is more difficult to attain the higher degrees of substitution of isothiuronium salt groups for halogen, without degradation of the polymer when the solution process is used. Also, it is frequently difficult to isolate or even to concentrate the solution to a degree that is sufficient for many applications due to the cross-linking that can occur during such isolation or concentration of solution. By utilizing the bulk process for the preparation of polymers having a high degree of substitution it is not only possible to replace 50% or more of the halo groups, which products are then water-soluble, but in many cases it is possible to obtain complete substitution of the halogen by the isothiuronium salt group.

In carrying out the reaction in bulk, any desired procedure can be used for blending the epihalohydrin polymer with the thiourea. Obviously, the more intimately the thiourea is dispersed in the polymer prior to heating to the reaction temperature, the more completely will the reaction take place. A convenient procedure is to simply blend the reaction components on a two-roll mill or other convenient mixing means. Lubricants and/or other milling aids such as sorbitan monosterate, antioxidants, etc., can be added. Such milling or blending can be done at any temperature from about room temperature up to about 85° C., preferably below the melting point of the thiourea. It is also frequently desirable to use a finely ground thiourea, i.e., use one having a particle size of 1–50 microns or less.

The temperature to which the blend is heated in carrying out the reaction and the length of the heating period will depend on the reactants, the degree of substitution desired, etc. In general, a temperature of from about 60° to about 160° C. will be adequate and preferably will be from about 70° to about 140° C. for a period of from a few minutes at the higher temperatures to as much as 1000 hours at the lower temperatures. The reaction conditions should obviously be so chosen as to avoid any appreciable cross-linking of the polymer due to decomposition of the isothiuronium groups. To this end it is generally desirable to carry out the reaction in an inert atmosphere or one that will subdue the decomposition of the isothiuronium group. While small amounts of solvents and/or nonsolvent diluents can be tolerated, they are preferably kept to less than about 25% of the total reaction mixture and, more preferably, completely avoided.

The isothiuronium salt product so prepared is in nearly pure form, the only major ingredient or impurity present being unreacted thiourea. If desired, this unreacted thiourea can be removed although for some applications this is not necessary. One way of removing the thiourea is to dissolve the reaction product mixture in water and then subject the solution to dialysis, gel filtration, or other appropriate means to remove the thiourea. Alternatively, the thiourea can be extracted from the bulk reaction product mixture or from an aqueous solution thereof by means of a solvent for the thiourea but which is a nonsolvent for the isothiuronium salt.

In carrying out the reaction in a solution process, the starting polymer is dissolved at any convenient concentration in a liquid diluent that is a solvent for the polymer, as for example, dimethylsulfoxide, dimethylformamide, N-methylpyrrolidone, benzene, etc. Frequently it is desirable to use a mixture of diluents, as for example, a small amount of acetone added to dimethylsulfoxide. Buffers such as sodium acetate can be used as can acids such as hydrogen chloride, acetic acid, etc., to keep the isothiuronium salt in its salt form. The thiourea is added to the solution and the mixture is then heated to the reaction temperature. As in the bulk process, the temperature and the length of the heating period will depend on the reactants, the degree of substitution desired, and, of course, also on the solvent used. In general, a temperature within the range of from about 60° to about 160° C. will be adequate and preferably will be from about 70° to about 140° C. The solution of the product can be used as prepared, or can be purified by adding water to dissolve the isothiuronium salt and then dialyzed or otherwise treated to isolate the product.

In many cases the isothiuronium salt product is lightly cross-linked as produced due to decomposition of some of the isothiuronium groups with the formation of disulfide cross-links. To assure water-solubility of the product, it may be necessary to add to the aqueous dissolving medium, small amounts, usually about 1 to about 20%, preferably about 2 to 10%, based on the weight of the polymer, of a reagent known to reduce or convert such disulfide linkages to separate groups, as for example, to mercaptan groups, sulfonic acid groups, etc. Compounds capable of such action are sodium bisulfite, mercaptoacetic acid, peroxides, chlorine, 1,4-dithioerythritol, etc.

In many cases it is advantageous to add to the water solutions of the polymer product additives such as sodium bisulfite or other oxygen scavengers to prevent any mercapto groups from premature oxidation. For many uses it may be desirable to add to the products various fillers (reinforcing and nonreinforcing), stabilizers, antioxidants, acid acceptors, corrosion inhibitors, cross-linking agents or promoters, plasticizers, etc.

The following examples will illustrate the process of preparing the new polymeric materials of this invention. All parts and percentages are by weight. The molecular weight of the isothiuronium salt is indicated by the RSV (reduced specific viscosity) determined on a 0.1% solution in 0.1 M aqueous KCl at 25° C., unless otherwise indicated. In each case the solution of isothiuronium salt obtained as the product was diluted with an appropriate amount of water+KCl to prepare the 0.1% solution on which the RSV was determined. The RSV of the starting polymers is that determined on a 0.1% solution in a given solvent and at a given temperature.

EXAMPLES 1–12

In these examples, an ethylene oxide-epichlorohydrin copolymer and thiourea were reacted. In Control A and Examples 1–6 the reaction was carried out in solution, the starting polymer being dissolved at the given concentration in dimethyl sulfoxide (DMSO), the thiourea added and the mixture was then heated under nitrogen. In Controls B and C and Examples 7–12 a mixture of the starting polymer and thiourea was blended on a two-roll mill for 10–20 minutes at 160–180° F., adding 1% by weight of sorbitan monostearate to aid depression of the thiourea in the copolymer. The 1:1 by weight mixture is 1.78 times and the 4:1 mixture is 0.45 time the stoichiometric amount of thiourea. The blend was then placed in a reactor, which had an atmosphere of nitrogen, after which the vessel and contents were heated to the specified temperature. At the end of the reaction time, the water-soluble fraction was dissolved, adding sodium bisulfite if necessary to aid in solubilizing the product, the solution was dialyzed by placing it in cellulose dialysis tubing and immersing the sack in distilled water, and after dialysis the water was removed by freeze-drying under vacuum and the product was analyzed. In the case of water-insoluble products, they were washed several times with water, dried and analyzed.

The reaction conditions are set forth in Table I along with the percent reaction, i.e., percent of chloro groups converted to isothiuronium salt groups as determined by sulfur and nitrogen analysis, the RSV of the product and its water-solubility. The polymer product had a $M_w$ of $>100,000$ in Examples 1 to 11 and a $M_w$ of $>500,000$ in Example 12. The starting copolymer used in each case was a 1:1 molar ethylene oxide:epichlorohydrin copolymer, having an RSV of 2.2 as measured on a 0.1% solution in α-chloronaphthalene containing 3% acetylacetone at 100° C. (a $M_w$ of 800,000) in Controls B and C and Examples 3–11 and an RSV of 5.7 as measured on a 0.1% solution in α-chloronaphthalene containing 3% acetylacetone at 100° C. (a $M_w$ of 2.7 million) in Control A and Examples 1, 2 and 12.

except that the reaction was carried out in an atmosphere of HCl (5 p.s.i.g.) instead of nitrogen. The percent reaction was 83. The product had an RSV of 0.57 (a $M_w$ of $>50,000$) and was completely water-soluble.

EXAMPLES 15–17

The general procedure described in Example 10 was repeated except that different thioureas were used. The amount of thiourea blended with the copolymer was 1.32 times the stoichiometric amount based on the chloro content of the polymer in the control and Examples 15 and 16 and 1.15 times the stoichiometric amount in Example 17. In Table II are set fourth the thiourea utilized, the reaction time and temperature, together with the properties of the polymer produced.

TABLE II

| Example | Thiourea reacted | Reaction conditions | | | Product | | |
|---|---|---|---|---|---|---|---|
| | | Temp., °C. | Hrs. | Reaction, percent | RSV | $M_w$ | Water solubility |
| Control | Ethylene thiourea. | 95 | 8.5 | 10.5 | [1] 0.46 | >100,000 | Insoluble. |
| 15 | do | 95 | 24 | 55 | 2.8 | >200,000 | Soluble with 5% NaHSO₃. |
| 16 | do | 140 | 24 | 78 | 0.33 | >50,000 | Soluble. |
| 17 | Trimethyl thiourea. | 121 | 17 | 71 | 1.9 | >200,000 | Soluble (with heating). |

[1] 0.1% solution in DMSO at 25° C.

EXAMPLES 18–28

These examples illustrate the preparation of isothiuronium salts of other epihalohydrin polymers. The general bulk process procedure described in Example 10 was used in Examples 18–23 and the solution procedure described in Example 6 was used in Examples 24–28 using a 10% solution of the polymer in DMSO in Example 24 and a 4% solution of the polymer in DMSO in Examples 25–28.

TABLE I

| Example | Reaction conditions | | | | | Isolated product | | |
|---|---|---|---|---|---|---|---|---|
| | Diluent | Polymer conc., percent | Temp., °C. | Hrs. | Polymer: thiourea | Reaction, Percent | RSV | Water solubility |
| Control A | DMSO | 4 | 65 | 72 | 23:1 | 2.3 | | Insoluble. |
| 1 | DMSO | 4 | 65 | 72 | [1] 1:1 | 5 | 0.3 | Soluble. |
| 2 | DMSO | 4 | {65 / +90} | {72 / 17} | 1:1 | {8 / 26} | 0.29 / 0.27 | Do. |
| 3 | DMSO | 4 | 65 | 72 | 1:1 | 10 | 0.08 | Do. |
| 4 | DMSO | 4 | 90 | 17 | 1:1 | 19.4 | [2] 14.5 | Do. |
| 5 | DMSO | 10 | 95 | 8.5 | 1:1 | 33 | 1.2 | Do. |
| 6 | DMSO | 4 | 95 | 24 | 1:4 | 73 | 3.5 | Do. |
| Control B | | | 65 | 9 | 1:1 | 31 | {[3] 0.46 / [2] 17.7} | Insoluble with 5% NaHSO₃. |
| Control C | | | 65 | 24 | 1:1 | 43 | [3] 9.93 | Do. |
| 7 | | | 95 | 24 | 4:1 | 45 | 0.92 | 42% of total product soluble with 5% NaHSO₃. |
| 8 | | | 95 | 24 | 2:1 | 50 | | 55% of total product soluble with 5% NaHSO₃. |
| 9 | | | 120 | 7 | 1:1 | 78 | 3.7 | Soluble with 3% NaHSO₃. |
| 10 | | | 95 | 22 | 1:1 | 84 | 3.7 | Soluble with 2% NaHSO₃. |
| 11 | | | 95 | 25 | 1:1 | 95 | 3.5 | Soluble with 3% NaHSO₃. |
| 12 | | | 95 | 24 | 1:1 | 99 | 5.7 | Soluble with 5% NaHSO₃. |

[1] Added 20% LiBr based on weight of thiourea.
[2] 0.1% solution in DMSO at 25° C.
[3] 0.1% solution in 0.1 M aqueous KCl containing 5.6% DMSO, at 25° C.

EXAMPLE 13

The procedure described for Example 10 was repeated except that the reaction was carried out in a suspension process by suspending 25 parts of the 1:1 polymer-thiourea mixture in 70 parts of n-heptane and then heating the suspension to 95° C. for 22 hours. The product so obtained was 90% reacted (i.e., chloro groups replaced by isothiuronium salt groups), had an RSV of 3.7 and was soluble in water.

EXAMPLE 14

The procedure described in Example 10 was repeated

All of the reactions were carried out at 95° C. for 24 hours except Example 24 which was carried out at 65° C. for 20 hours and Example 25 which was carried out at 65° C. for 72 hours and then at 90° C. for 17 hours. In Table III are set forth the composition of the polymer reacted, the stoichiometric ratio of thiourea to the halogen content of the polymer, and the properties of the water-soluble polymer so produced. The following abbreviations are used to denote the monomers being polymerized: ECH=epichlorohydrin; EO=ethylene oxide; and EBH=epibromohydrin.

TABLE III

| Example | Starting polymer | | | Reaction conditions, stoic. ratio, thiourea: halogen | Product | | | |
|---|---|---|---|---|---|---|---|---|
| | Monomers | Mole percent | RSV [1] | | Reaction, percent | RSV [2] | Water solubility | $M_w$ |
| 18 | ECH | Homopolymer | 1.8 | 2.5 | 85 | 1.7 | Soluble with 5% NaHSO$_3$ | >200,000 |
| 19 | EO/ECH | 35/65 | 4.5 | 1.6 | 82 | 2.3 | 60% of total product soluble with 5% NaHSO$_3$. | >300,000 |
| 20 | EO/ECH | 75/25 | 4.9 | 3.1 | 98 | 4.0 | Soluble with 5% NaHSO$_3$ | >800,000 |
| 21 | EO/ECH | 90/10 | 4.3 | 2.9 | 82 | 5.0 | ___do___ | >1,000,000 |
| 22 | EO/ECH | 90/10 | 4.3 | 6.1 | 100 | 2.6 | ___do___ | >500,000 |
| 23 | EO/EBH | 45/55 | 1.1 | 1.05 | 98 | 2.8 | ___do___ | >100,000 |
| 24 | EO/ECH | 75/25 | 4.9 | 3.1 | 9 | 0.42 | Soluble | >100,000 |
| 25 | EO/ECH | 35/65 | 4.5 | 1.5 | 24 | 0.23 | ___do___ | >100,000 |
| 26 | EO/EBH | 45/55 | 1.1 | 2.06 | 68 | 0.9 | ___do___ | >100,000 |
| 27 | ECH/EBH/EO | 45/5/50 | 1.3 | 1.78 | 49 | 0.8 | ___do___ | >100,000 |
| 28 | ECH/EBH/EO | 30/20/50 | 1.5 | 1.54 | 61 | 1.1 | ___do___ | >100,000 |

[1] 0.1% solution in α-chloronaphthalene containing 3% acetylacetone at 100° C.
[2] 0.1% solution in 0.1 M aqueous KCl at 25° C.

EXAMPLE 29

Twenty parts of an amorphous poly(epibromohydrin) having an RSV of 0.23 as determined on a 0.1% solution in tetrachloroethane at 25° C. (a $M_w$>100,000) was milled on a two-roll mill with 20 parts of ethylene thiourea (having a particle size of 1–8μ) and 0.2 part of sorbitan monostearate. The blend was then reacted under nitrogen for 8 hours at 65° C. The product was soluble in water without the addition of bisulfite. One part of the product blend was dissolved in 24 parts of deaerated water and the solution was dialyzed and then analyzed. The polymer had an RSV of 2.6 (0.1% solution in 1 M KCl at 25° C.), a $M_w$ of >100,000, and the percent of bromo groups converted to isothiuronium salt group as determined by sulfur and nitrogen analysis was 47%.

EXAMPLE 30

Thirty parts of amorphous poly(epichlorohydrin) having an RSV of 1.8 as measured on a 0.1% solution in α-chloronaphthalene containing 3% acetylacetone at 100° C. was blended with 32.8 parts of ethylene thiourea (1.2 times the stoichiometric amount) and 0.3 part of sorbitan monostearate on a two-roll mill. The blend was then reacted for 17 hours at 125° C. A 4% solution of the product in water was prepared with 2.5%, based on the weight of the polymer, of sodium bisulfite. The polymer had an RSV of 1.3 (0.1% solution in 1 M KCl at 25° C.), a $M_w$ of >100,000, and the percent of chloro groups converted to isothiuronium salt groups as determined by sulfur and nitrogen analysis was 88%.

As previously stated, the new polymers containing isothiuronium salt groups have a wide variety of use applications. For example, these products are useful for shrinkproofing wool, as flocculating agents, and as coating agents for textiles to increase their antistatic properties, contribute comfort properties, flame resistance, etc. They are unique in that they increase both wet and dry strength of paper. They are, of course, also useful for the preparation of derived products by converting part or all of the isothiuronium salt groups to mercapto groups that can be added to epoxides, aziridines, episulfides, ethylene double bonds, or reacted with formaldehyde, etc. Any unreacted chlorine in the product can be reacted with other nucleophiles to give useful modified products. For example, it can be reacted with ammonia, primary, secondary or tertiary amines, or mercaptocarboxylic or sulfonic acids to give additional cationic or also anionic groups in the product. The unreacted chlorine can also be reacted with alkali metal mercaptans and thiophenols or with a metal salt of an α-alkalimetallocarboxylic acid, a mercaptocarboxylic acid, a mercaptophosphorus compound, etc. The isothiuronium salt polymer products are also useful as dyeing aids for synthetic fibers. The following examples are presented to illustrate a few of these uses.

EXAMPLE 31

This example illustrates the use of an epihalohydrin polymer isothiuronium salt as a shrinkproofing agent for wool. The fabric used in these tests was a wool flannel.

The undialyzed solution of the isothiuronium salt of epichlorhydrin-ethylene oxide in water prepared in Example 13 was diluted with water to concentrations of 1.5% and 3% by weight of polymer (the solution also containing 0.7 and 1.5%, respectively, of unreacted thiourea) and the acidity was adjusted to a pH of 7.3. In each case, 0.05%, based on the weight of the solution, of a commercial wetting agent was added.

Two lengths of the fabric were pretreated, one by padding with 2% aqueous sodium bisulfite, rinsing and drying, and another by padding with a 1.5% aqueous solution of sodium dichloroisocyanurate, containing the same amount of the wetting agent, then after 1.5 minutes passing the fabric through a 2% aqueous sodium bisulfite solution, rinsing and drying.

Swatches of the pretreated fabrics and of fabric with no pretreatment were then saturated with the isothiuronium salt solution for 1 minute, squeezed through the rolls of a padding machine and after weighing to determine the solution pick-up, the swatches were dried and cured by heating in a vented circulating air oven at 107° C. for 15 minutes. The treated swatches along with swatches of the untreated fabric and the two pretreated fabrics were relaxed by soaking for 15 minutes and then rotating for 5 minutes in a cube-shaped washing machine charged with 25 liters of 41° C. water containing 200 g. Na$_2$HPO$_4$, 112.5 g. NaH$_2$PO$_4$, and 12.5 ml. of wetting agent, after which the swatches were rinsed and dried. Each of the swatches was then subjected, first to a mild felting test (tumbling in 25 liters of a solution containing 200 g. Na$_2$HPO$_4$ and 112.5 g. NaH$_2$PO$_4$ for 60 minutes at 41° C. rinsed with water and dried) and then, after measuring, to a severe felting test (tumbling in 12.5 liters of the same sodium acid phosphate solution for 45 minutes at 41° C. and again rinsed and dried). The percent shrinkage was then measured for each swatch.

Tabulated below are the percent felting for each swatch, together with controls run at the same time with no shrinkproofing agent.

| Shrinkproofing agent Added | Add-on, percent | Shrinkage, percent | |
|---|---|---|---|
| | | Mild felting | Severe felting |
| No fabric pretreatment: | | | |
| None | | 27 | 56 |
| Isothiuronium salt | 1.4 | 4 | 29 |
| Do | 3.4 | 0 | 5 |
| Sodium bisulfite pretreatment: | | | |
| None | | 25 | 51 |
| Isothiuronium salt | 1.2 | 4 | 28 |
| Do | 3.2 | 0 | 7 |
| Sodium dichloroisocyanurate plus sodium bisulfite pretreatment: | | | |
| None | | 5 | 39 |
| Isothiuronium salt | 1.3 | −2 | 0 |
| Do | 3.3 | −1.2 | 0 |

The above test results show that the epichlorohydrin polymer isothiuronium salt is not only an effective shrinkproofing agent but can even be used without fabric pretreatment.

EXAMPLE 32

The isothiuronium salts produced in Examples 20, 24 and 30 were tested as shrinkproofing agents on various woolen materials by the severe felting test described in Example 31. The aqueous resin solutions were adjusted to a pH of 8 in the tests made on the resins of Examples 20 and 30 and to a pH of 3.5 in the test on the resin of Example 24. The resin solutions were applied to the woolens (without pretreatment) and after the relaxation procedure, the severe felting test was run through three full, complete cycles. Tabulated below are the percent shrinkage given on a cumulative basis compared with controls where the woolen received no treatment.

| Ex. | Isothiuronium salt of— | Add-on, percent | Cure conditions, min./° C. | Area shrinkage, percent | | |
|---|---|---|---|---|---|---|
| | | | | First wash | Second wash | Third wash |
| 32A | Test on wool flannel: | | | | | |
| | Control | 0 | | 29 | 40 | 47 |
| | Ex. 24 | 3.5 | 15/120 | 0 | 0 | 0 |
| | Ex. 30 | 2.1 | 15/104 | 0 | 0 | 3 |
| | | 3.3 | 15/104 | 0 | 0 | 0 |
| 32B | Test on worsted wool flannel: | | | | | |
| | Control | 0 | | 45 | 57 | 60 |
| | Ex. 20 | 2.4 | 30/120 | 0 | 1 | 3 |
| | | 4.1 | 30/120 | 0 | 0 | 1 |
| | Ex. 24 | 3.5 | 15/120 | 0 | 1 | 6 |
| 32C | Test on wool knit: | | | | | |
| | Control | 0 | | 57 | 64 | 68 |
| | Ex. 20 | 2.6 | 30/120 | 7 | 7 | 11 |
| | | 4.7 | 30/120 | 7 | 7 | 7 |
| | Ex. 24 | 3.5 | 15/120 | 0 | 10 | 26 |
| 32D | Test on worsted knit: | | | | | |
| | Control | 0 | | 58 | 65 | 70 |
| | Ex. 20 | 4.4 | 30/120 | 4 | 6 | 9 |

EXAMPLE 33

This example illustrates the use of the epihalohydrin polymer isothiuronium salts as flocculating agents. In these tests, 5% suspensions of a crystalline silica (5 micron particle size) and of kaolin in water were prepared. To 100 ml. of the suspension in a glass-stoppered graduated cylinder was added an amount of the aqueous solution of the product of Example 2 or Example 10 in an amount expressed as parts-per-million based on the silica or kaolin. The cylinder was rotated 360° twenty times and after settling for 5 minutes the ml. of supernatant was observed. After 15 minutes, a portion of the supernatant was removed and the turbidity was measured with a Klett Summerson Colorimeter using a blue filter. The turbidity is given as Klett Units (KU), the higher the number the more turbid and hence the less effective is the flocculating agent.

Tabulated below is the ml. of supernatant and Klett Units for each of these products in comparison with the data obtained using commercially accepted cationic polymers.

| Flocculation agent | P.p.m. | Supernatant, ml. | KU |
|---|---|---|---|
| Silica flocculation: | | | |
| Control A | 100 | No flocculation at this dilution | |
| Control B | 100 | 52 | 21 |
| Control C | 100 | 71 | 46 |
| Product of: | | | |
| Ex. 2 | 50 | 72 | 55 |
| Ex. 10 | 100 | 61 | 73 |
| Kaolin flocculation: | | | |
| Control A | 100 | 73 | 16 |
| Control D | 100 | 40 | 24 |
| Product of: | | | |
| Ex. 2 | 50 | 38 | 56 |
| | 100 | 47 | 44 |
| Ex. 10 | 100 | 54 | 14 |

NOTE.—
Control A = a 95/5 mole copolymer of acrylamide and (2-methacryloyloxy) ethyl trimethylammonium methyl sulfate.
Control B = homopolymer of (2-methacryloyloxy) ethyl trimethylammonium methyl sulfate.
Control C = poly(1,2-dimethyl-5-vinyl pyridinium methyl sulfate).
Control D = a 90/10 mole copolymer of acrylamide and (2-methacryloyloxy) ethyl trimethylammonium methyl sulfate.

EXAMPLE 34

This example illustrates the use of the epihalohydrin polymer isothiuronium salts as paper additives for increasing both the dry and wet strength of paper.

Paper handsheets were prepared on paper making equipment from bleached kraft paper pulp by heating the pulp in a cycle beater at 4% concentration in tap water to an 840 ml. Schopper-Riegler freeness, after which it was diluted to 2.5% concentration with tap water and sodium carbonate was added to a concentration of 0.005%. The isothiuronium salt product of Example 12 was added to the pulp slurry in an amount to give 1% by weight (total solids) of the dry pulp weight. After stirring for 10 minutes, handsheets (40 lb./ream) were made using water in the proportioner and deckle box which contained 120 p.p.m. of sodium carbonate and which was adjusted to a pH of 9.5. The handsheets were drum dried at 250° F. for 1 minute and then cured in an oven for 1 hour at 105° C. The wet and dry strengths were then measured with the following results compared to a control where the isothiuronium salt polymer was omitted.

| | Wet strength, tensile (lb./in.) | Dry strength | |
|---|---|---|---|
| | | Burst (p.s.i.) | Tensile (lb./in.) |
| Control | <0.3 | 38.7 | 24.1 |
| Product of Ex. 12 | 4.3 | 47.7 | 27.6 |

EXAMPLE 35

This example illustrates the preparation of water-soluble mercaptan substituted polyethers from the epihalohydrin isothiuronium salt polymers.

(A) To 50 parts of a 1% aqueous solution prepared from the product of Example 12 was added, with stirring, an amount of 0.4 N sodium hydroxide equivalent to 75% of the isothiuronium salt groups. The mixture was stirred for 4 hours at room temperature after which the pH was 9.0. The product was largely water-soluble. A film was cast and air dried overnight. It was insoluble in and only slightly swollen in water.

(B) A 4% aqueous solution prepared from the product of Example 12 was dialyzed against water to remove the unreacted thiourea. The solution so obtained had a concentration of 0.6%. To 100 parts of this solution, under nitrogen, was added, while stirring, an amount of 0.4 N sodium hydroxide equivalent to 50% of the isothiuronium salt groups. The mixture was stirred for 4 hours at room temperature to give a clear solution. On titrating with 0.1 N iodine it was found that 48% of the isothiuronium salt groups had been converted to mercapto groups. The disulfide product was still a water solution. A film was cast from the product and dried in air overnight. It was a water-insoluble film.

What we claim and desire to protect by Letters Patent is:

1. A water-soluble isothiuronium salt of an epihalohydrin polymer wherein at least about 5% of the halo groups of the epihalohydrin polymer have been substituted by isothiuronium hydrohalide groups, said epihalohydrin polymer being a homopolymer of epihalohydrin, a copolymer of at least two epihalohydrins or a copolymer of at least one epihalohydrin and ethylene oxide and said isothiuronium salt of the epihalohydrin polymer having a molecular weight of at least 50,000 and containing an average of at least about five isothiuronium salt groups per molecule, said isothiuronium salt groups having the formula

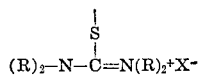

where each R is selected from the group consisting of H, alkyl, alkenyl, cycloalkyl, cycloalkenyl, aryl, alkaryl and aralkyl or together with a second R is akylene, and X⁻ is a halide ion.

2. The product of claim 1 wherein the epihalohydrin polymer is a homopolymer of epichlorohydrin.

3. The product of claim 1 wherein the epihalohydrin polymer is a copolymer of epichlorohydrin and ethylene oxide containing at least about 2 weight percent of epichlorohydrin.

4. The product of claim 1 wherein the epihalohydrin polymer is a copolymer of epibromohydrin and ethylene oxide containing at least about 2 weight percent of epibromohydrin.

5. The product of claim 3 where the copolymer has a weight ratio of epichlorohydrin to ethylene oxide of from about 10:90 to about 90:10.

6. The product of claim 3 wherein the copolymer contains at least about 50% epichlorohydrin and at least 50% of the chloro groups have been substituted by isothiuronium hydrochloride groups.

7. The process of preparing a water-soluble isothiuronium salt of an epihalohydrin polymer which comprises heating, in an oxygen-free atmosphere, a mixture of an epihalohydrin polymer, selected from epihalohydrin homopolymers, copolymers of at least two epihalohydrins, and copolymers of at least one epihalohydrin and ethylene oxide, with a thiourea, to a temperature of from about 60° C. to about 160° C. until at least about 5% of the halo groups in the epihalohydrin polymer have been converted to isothiuronium hydrohalide groups, the amount of thiourea being at least 10% in excess of the stoichiometric amount based on the halogen content of the polymer, said thiourea having the formula

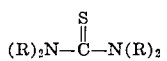

where each R is selected from the group consisting of H, alkyl, alkenyl, cycloalkyl, cycloalkenyl, aryl, alkaryl and aralkyl or together with a second R is alkylene.

8. The process of claim 7 wherein the reaction is carried out in a liquid diluent medium that is a solvent for the epihalohydrin polymer.

9. The process of claim 7 wherein the reaction is carried out in the substantial absence of a liquid diluent and the mixture is heated until at least about 50% of the halo groups in the epihalohydrin polymer have been converted to isothiuronium hydrohalide groups.

References Cited
UNITED STATES PATENTS 3,417,060 12/1968 Breslow _____ 260—79
3,474,045 10/1969 Vanderberg et al. _____ 260—2

DONALD E. CZAJA, Primary Examiner

M. I. MARQUIS, Assistant Examiner

U.S. Cl. X.R.
117—139.5A; 162—164R; 260—2A, 37AL, 79.1R